Dec. 28, 1954     D. PONTBRIAND     2,698,132
TAXIMETER

Filed Dec. 17, 1951     5 Sheets-Sheet 1

Inventor
Dubreuil Pontbriand

Attorneys

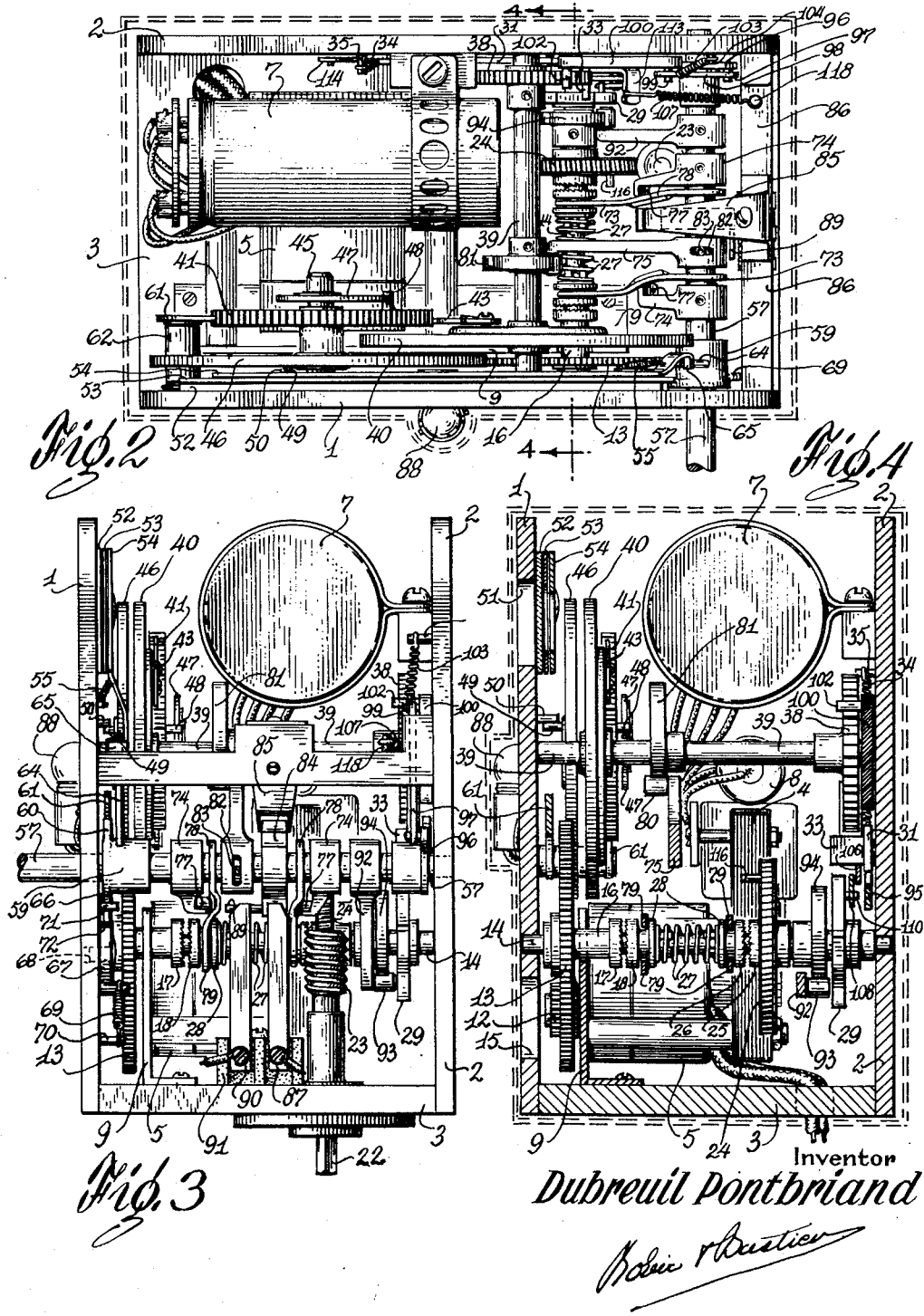

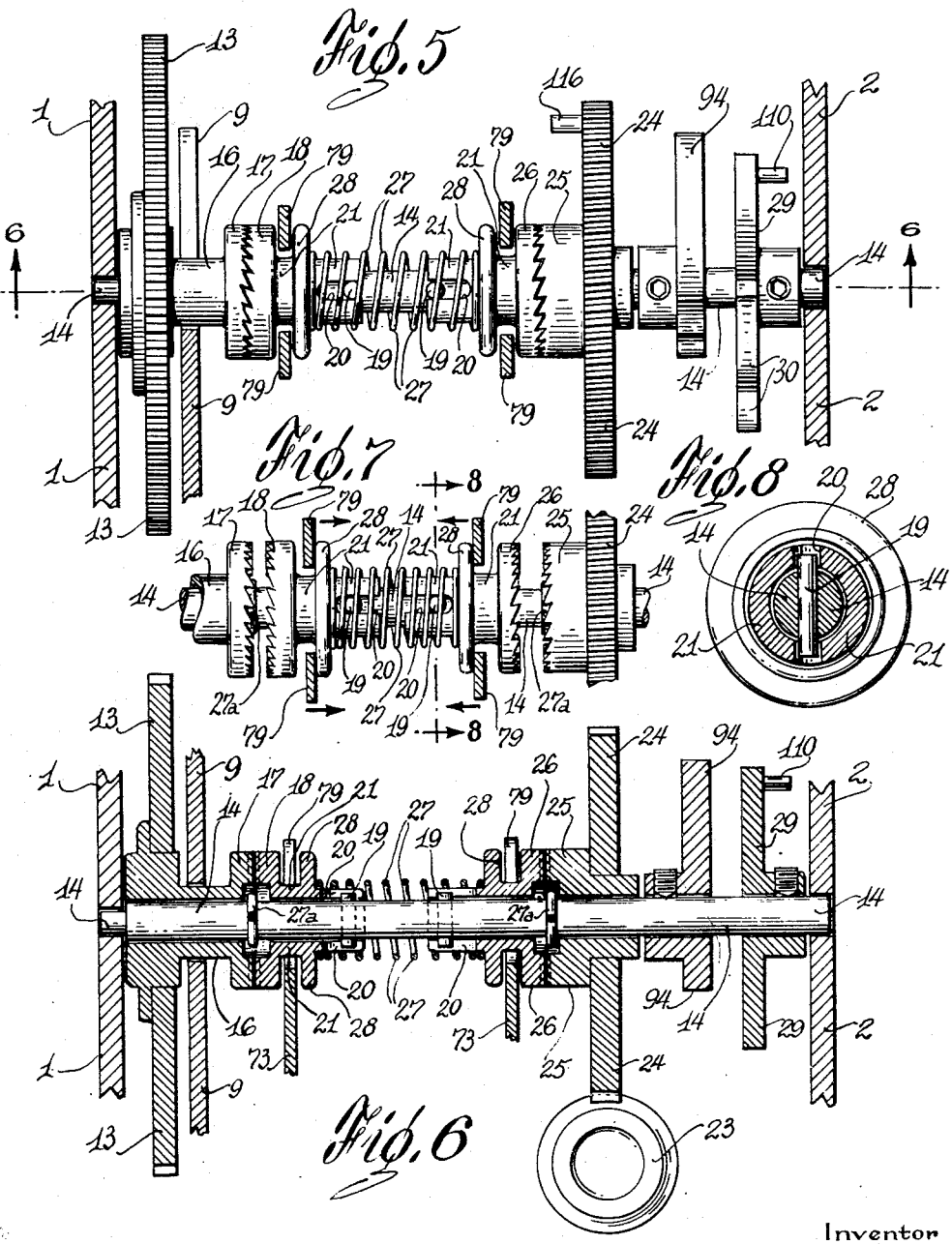

Inventor
Dubreuil Pontbriand

Attorneys

Dec. 28, 1954     D. PONTBRIAND     2,698,132
TAXIMETER
Filed Dec. 17, 1951     5 Sheets-Sheet 5
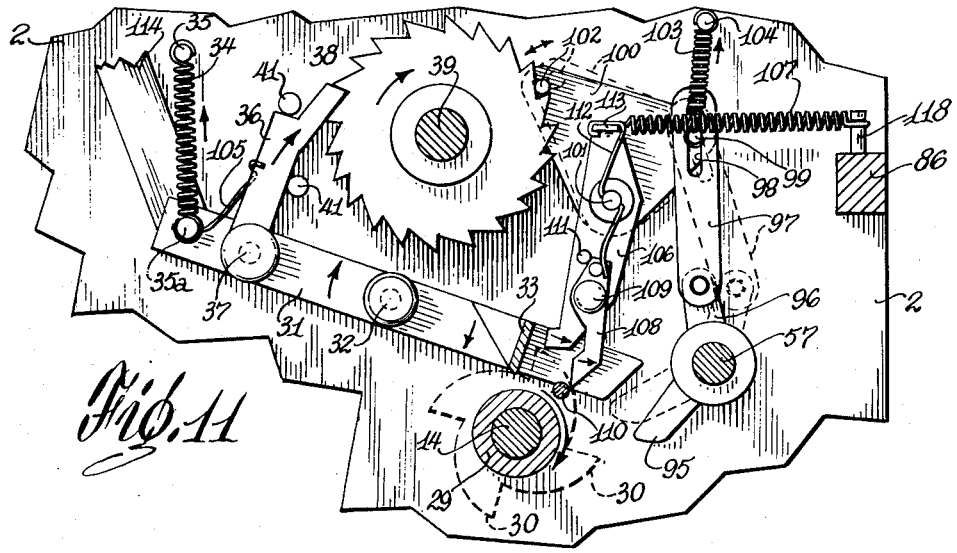
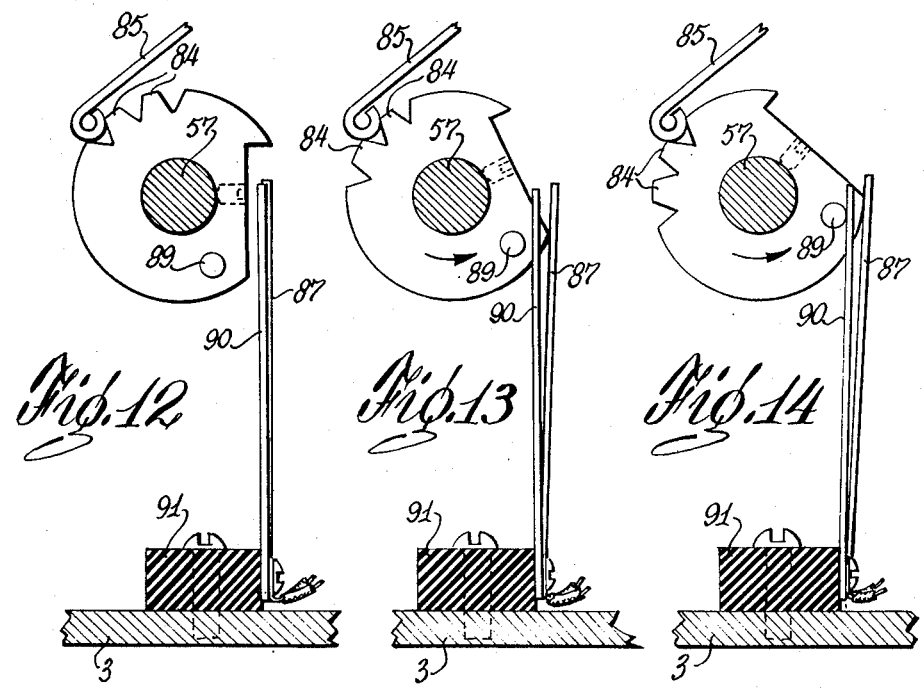
Inventor
*Dubreuil Pontbriand*
Attorneys

United States Patent Office 2,698,132
Patented Dec. 28, 1954

2,698,132

TAXIMETER

Dubreuil Pontbriand, Montreal, Quebec, Canada

Application December 17, 1951, Serial No. 261,942

4 Claims. (Cl. 235—30)

The present invention relates to registering mechanisms and, more particularly, those fare-calculating devices known as taximeters.

Since the advent of automobiles for general transportation, it has been the practice of providing public hired vehicles with fare-calculating means for registering the mileage covered by the vehicles, or the time they were occupied or chartered. Such means being called taximeters, vehicles equipped therewith became known under the abbreviation of "taxis."

Taximeters, to be useful, must be reliable and capable of correctly registering the distance covered, the occupation time of the vehicle when not in motion (as a function of a minimum predetermined linear speed) and co-relate accurately the results obtained into a total amount based on a fee or fare for units of distance and time. Furthermore, to avoid the public abuse of taxis for unduly short distances or times of occupation, a minimum "starting" or basic fare has been established which fare, of course, the taximater must also indicate.

To meet the objectives above, taximeters have evolved into complicated mechanisms responsive to linear speeds and distances, including an horological device for time measurement, preferably adjustable as to varying fares and capable of being changed to meet the legal regulations of political districts into which the taxi-meter-equipped vehicles may have to travel.

The requirements above represent a rather considerable list of special mechanisms which must be included in a taximeter, which mechanisms are complicated, require occasional servicing and makeup an imposing total contributing to the high cost of the taximeter as a whole.

The present invention has been conceived to avoid the drawbacks noted above in a device meeting the main objectives of simplicity, high efficiency, compactness and relative inexpensiveness.

An important object, also contemplates the provision of a taximeter in which a speed take-off shaft and time-counting shaft are so combined as to permit instant selective engagement and disengagement by means of the control or "flag" shaft.

Another important object of the present invention is the provision of a taximeter of the character described provided with very simple means for preventing the operation of the registering mechanism during the initial period normally covered by a basic initial fare.

A further object of the present invention resides in the provision of a taximeter having means for rendering the fare calculating dials immune to the shocks and disturbances to which said dials are normally subjected.

Yet another important object of the present invention envisages a taximeter of the character described in which the changing of the basic fare is a simple operation.

A still further object of the present invention is the provision of a taximeter constructed of easily accessible parts.

Yet another important object of the present invention is the provision of a taximeter of the character described provided with means to prevent tampering with the same.

The foregoing and other important objects of the invention will become more apparent during the following disclosure and by referring to the drawings in which:

Figure 2 is a top plan view of the taximeter according to the invention;

Figure 3 is a side elevation of the same;

Figure 4 is a cross-section along line 4—4 of Figure 2;

Figure 5 is a detailed view of the main shaft showing clutch elements in engaged position;

Figure 6 is a longitudinal section along line 6—6 of Figure 5;

Figure 7 is a fractional view of the main shaft showing the clutch elements in disengaged position;

Figure 8 is a cross-section along line 8—8 of Figure 7;

Figures 9, 10 and 11 are sectional elevations of the fare dial actuating mechanism in various operational positions;

Figures 12, 13 and 14 shows the various positions of the flag or control shaft: namely, the vacant position, the waiting time non-recording position and the waiting time recording position, respectively.

Figure 1:
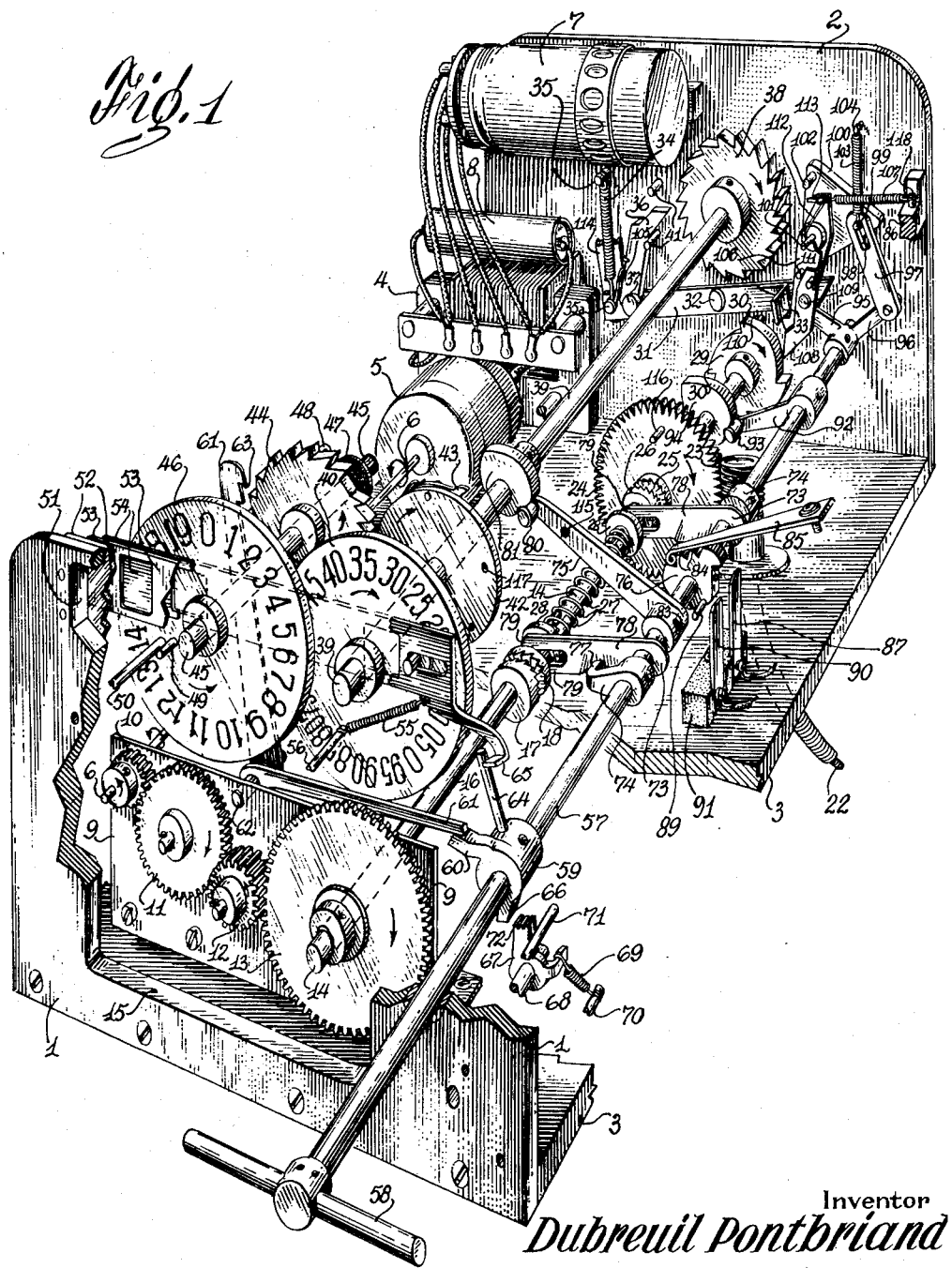
Figure 1 is a perspective view of the various parts in their operating relationship.

Referring now more particularly to the drawings in which like reference characters indicate like elements throughout, the mechanism of the taximeter according to the invention is enclosed in a suitable box of which the front wall 1, the back wall 2 and the bottom 3 are shown in the drawings. The time mechanism comprises a synchronous motor 4 provided with suitable speed reducing mechanism enclosed in the housing 5 to drive the shaft 6 at a constant speed of preferably one revolution per minute. The synchronous motor 4 is connected to the vibrator 7 of any known type which converts the direct current from the battery of the car into a pulsating current. A condenser 8 is also connected to the electric circuit of the taximeter.

The driving shaft 6 is journalled at its free end on a support plate 9 secured to the bottom 3 and mounts a pinion 10 meshing with the gear wheel 11, the latter meshing with a second pinion 12 which meshes in turn with a second gear wheel 13 freely rotatable on the main shaft 14. The pinions 10 and 12 and the gear wheel 11 are all mounted at the front of the support plate 9 disposed adjacent the front wall 1 of the casing opposite the window 15 made in said wall 1, through which the gearing may be quickly and readily changed according to the tariff desired for the waiting time recording.

The second gear wheel 13 is keyed to the sleeve 16 freely rotatable on the main shaft 14 and provided at its other end with a clutch member 17 keyed thereto and adapted to engage or mesh with the complementary clutch member 18, itself axially displaceable on the main shaft 14 but rotatively connected to the same by means of a pin 19 secured to the shaft 14 and engaging longitudinal slots 20 made in the depending sleeve 21 of said clutch member 18 as shown in Figures 5 to 8.

When the clutch members 17 and 18 are interengaging, the gear wheel 13 will be able to drive the main shaft 14 in only one direction, namely the clockwise direction, as shown by the arrows in Figure 1, and at a constant speed determined by the gear ratio obtained from the gear train 10, 11, 12 and 13.

The main shaft 14 extends transverse of the casing and is journalled at its ends in the front and back walls 1 and 2 of the casing.

As shown in Figure 1, the taximeter according to the invention, is connected to the speedometer of the car by a flexible cable 22 driving the worm screw 23 meshing with the worm gear 24 itself freely mounted on the main shaft 14 and secured to the clutch member 25, the latter engageable with a complementary clutch member 26 axially displaceable on the main shaft 14 and rotatively connected to the same.

The clutch member 26 is similar and opposed to the clutch member 18, having a sleeve 21 provided with slots 20 receiving a pin 19 extending through the main shaft 14. Said clutch members are urged outwardly in clutching position by a coil spring 27 surrounding the shaft 18 and abutting the flange 28 of the sleeve 21 respectively of the clutch members 18 and 26 as shown in Figures 5–8. Rings 27a secured to the main shaft 14 between each pair of associated clutch members limit the axial displacement of the latter on said shaft.

When the taxi-cab is moving at less than a predetermined speed, the main shaft 14 will be driven by the time mechanism, the clutch member 17 driving the complementary clutch member 18 and the teeth of the clutch member 26 slipping over the teeth of the clutch member 25. Whenever the speed of the taxi-cab is increased above that predetermined minimum speed, the main shaft 14 is then driven by the worm wheel 24 and clutch member 25 which engages the complementary clutch member 26 keyed to the main shaft 14. In that case, the main shaft rotates at a higher speed than the gear wheel 13 and associated clutch member 17 and therefore the teeth of the latter slips over the teeth of the complementary clutch member 18.

The clutch members 18 and 26 are urged into engagement with their respective clutch members 17 and 25 by means of the coil spring 27 and out of engagement by the free ends of the declutching arms 73, operated by the main control shaft in a manner described hereafter.

A multilobed wheel 29 is rigidly secured to the other end of the main shaft 14 adjacent the back wall 2 and its lobes 30 are adapted to actuate the lever 31 pivoted at 32 to the back wall 2 by engaging the right angle projection 33 at one end of said lever 31. The other end of the lever 31 is urged upwardly by means of a tension spring 34 secured thereto at 35a and at its other end to the back wall 2 by the pin 35. A pawl 36 is pivotally secured at 37 on the lever 31, adjacent the attachment of the spring 34, and is guided to engage the teeth of the ratchet wheel 38 by means of two spaced pins 41 projecting from the back wall 2. The ratchet wheel 38 is keyed to the shaft 39 carrying at its other end the fare dial 40 on which fractions of a dollar are registered.

The shaft 39 is journalled in the front and back walls 1 and 2 of the casing and extend in parallel relationship with the main shaft 14. A disc 42 secured to the back of the dial 40, carries a pawl 43 which is adapted to engage the teeth of the ratchet wheel 44 freely rotatable on the shaft 45 together with a second fare dial 46 on which dollars are registered. The ratchet wheel 44 and the fare dial 46 are secured to one another while the shaft 45 is rigidly secured to the front wall 1 of the casing. A spiral spring 47 secured to the shaft 25 at one end and to the pin 48 on the ratchet wheel 44 at the other end, urges the return of the fare dial 46 and ratchet wheel to their starting position.

It will be noted that one tooth of the ratchet wheel 44 is missing to leave a free passage for the pawl 43 on the disc 42 when the fare dial 46 has made a complete revolution and attained its limit position. The starting position of the fare dial 46 is attained when the pin 49 projecting from the front end of said dial abuts the pin 50 projecting inwardly from the front wall 1.

The denominations of the fare dials 40 and 46 are adapted to show through registering windows 51 made in the front wall 1 of the casing, said windows 51 being covered on the inside with a sheet 52 of transparent material as shown in Figure 4, and adapted to be closed by a shutter 53 slidable between said sheet 52 and a support and guiding member 54. When the meter is in non-vacant position, the shutter 53 is opened by means of the spring 55 as shown in Figure 1 secured thereto at one end and at its other end to a pin 56 mounted on the inner face of the front wall 1. The shutter 53 is closed by means of the control shaft of the taximeter in a manner described hereafter.

A control shaft 57 extending parallel to the main shaft 14 is journalled in the front and back walls 1 and 2 of the casing and its front end projection is provided with a handle, 58. The usual flag could also be mounted at the back end of said shaft. The control shaft is rotatable to assume three main positions, namely: a vacant position, shown in Figure 1, a non-recording waiting time position and a recording waiting time position.

On the shaft 57 is secured an element 59 having an arm 60 adapted to abut and lift the free end of a bell crank 61 pivoted at 62 on the plate 9 and provided at its other end with teeth 63 forming a holding pawl for the ratchet wheel 44 against return movement of the latter. When the control shaft 57 is in vacant position the bell crank 61 is held out of engagement with said ratchet wheel 44.

The element 59 on the control shaft 57 is also provided with a rod 64 adapted to actuate the shutter 53 by engaging the extension 65 thereof whereby said shutter closes when the control shaft is in vacant position.

The element 59 is further provided with a finger 66 adapted to contact the catch 67 pivoted on a shaft 68 secured to the front wall 1 of the casing and urged away from said finger by means of a tension spring 69 secured at its other end to a pin 70 mounted on the front wall 1. A second pin 71 limits the outward movement of said catch 67 and is also secured to the front wall 1. The catch 67 has a plurality of end teeth 72 so shaped that they will remain in engagement with the finger 66 when the control shaft 57 is in either waiting time recording or non-recording position and will disengage said finger 66 only when said shaft is in fully vacant position. Therefore, the control shaft 57 has to be turned to fully vacant position before the taximeter may register a succeeding trip.

The declutching arms 73 are freely mounted on the control shaft 57 between the collars of the actuating finger 74 and the roller arm 75 on the one hand and between the element 76 and the collar of the other actuating finger 74 on the other hand. The actuating fingers 74 have a right angle projection 77 adapted to contact the inclined surface 78 of the declutching arms 73 whereby displacing the latter towards each other upon rotation of the control shaft 57 to its vacant position; in this manner the forked free end 79 of each arm 73 declutches its associated clutch member 18 or 26 by abutting the flange 28 of the same.

The arm 75 is provided with an end roller 80 adapted to contact the periphery of the heart cam 81 keyed to the dial shaft 39 whereby rotation of the control shaft 57 to its vacant position will cause said dial shaft 25 to return to its initial position. It will be noted that the heart cam 81 may be keyed to the dial shaft 39 in any angular relationship relatively to the fare dial 40 in order that the desired initial or starting tariff may show through the corresponding window 51.

As shown in Figure 3, the collar of the roller arm 75 is provided with a slot 82 receiving the screw 83 secured to the control shaft 57 in order to obtain a certain play between said arm 75 and the control shaft 57 for preventing the arm 75 from contacting the main shaft 14 when the control shaft 57 is in recording position.

The element 76 keyed on the control shaft 57 is provided with a series of teeth 84 adapted to be engaged by the free end of a leaf spring holding element 85 secured at the other end to a brace 86 secured to and extending between the walls 1, 2, said element 85 holding the control shaft 57 in either one of its three positions.

As shown in Figure 13, when the control shaft 57 is in its waiting time non recording position, the element 76 abuts the electric contact leaf spring 87 for closing the electric circuit to the light bulb 88, shown in Figures 2 and 3 for illuminating the fare dials.

The element 76 is further provided with a pin 89 which abuts the leaf spring electric contact 90, when the control shaft 57 is in waiting time recording position, for closing the electric circuit to the driving motor 4 (see Figure 14). The contacts 87 and 90 are secured at their lower end to an insulating block 91 mounted on the bottom 3.

A positioning arm 92 is keyed on the control shaft 57 and is provided at its free end with a roller 93 adapted to abut the periphery of the heart cam 94, rigidly keyed to the main shaft 14, in order to return the latter to its initial position upon rotation of the control shaft 57 to its vacant position.

Finally, a finger 95 is keyed on the control shaft 57 adjacent the back wall 2 of the casing, and is adapted to abut and lift the actuating lever 31 when the control shaft 57 is in vacant position in order to disengage the pawl 36 from the ratchet wheel 38. A second finger 96 is rigid with and extends at an angle from the finger 95, being pivotally attached at its free end to a link 97 having at its other end a slot 98 for receiving a pin 99 secured to a triangular plate 100 pivoted at 101 on the back wall 2 of the casing, said triangular plate having a second pin 102 adapted to engage the teeth of the ratchet wheel 38, thereby forming a holding pawl to prevent return movement of said ratchet wheel.

Figure 9:
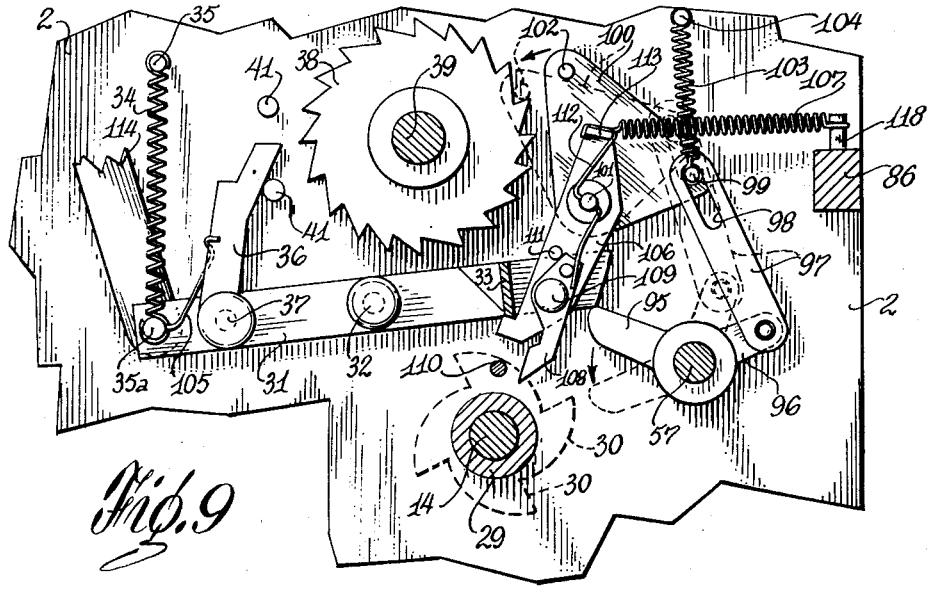

A tension spring 103 secured at 104 to the back wall 2 and at its other end to the pin 99 of the triangular plate 100 urges the latter towards the ratchet wheel 38. When the control shaft 57 is in vacant position, the second finger 96 causes the link 97 to pivot the triangular plate 100 away from the ratchet wheel 38 as shown in full outline in Figure 9.

Figure 10:
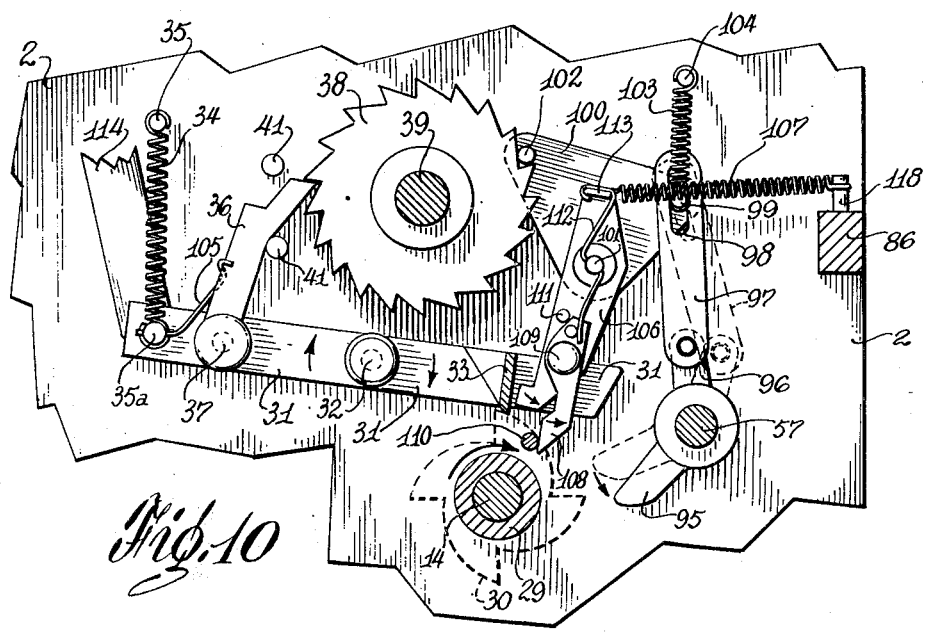

During operation of the meter, when the control shaft 57 is in either one of its non vacant positions, pin 102 is always in contact with the teeth of the ratchet wheel 38 and therefore prevents accidental rotation of said ratchet wheel under jerks from the vehicle (see Figures 10 and 11). The pawl 36 is urged against the periphery of the ratchet wheel 38 by means of a spring wire 105 secured at 35a to the lever 31. A catch lever 106 is pivoted at 101 at the back wall 2 and is urged by means of a tension spring 107 to engage the right angle projection 33 of the lever 31 for maintaining the latter in lifted position. The spring 107 is secured at one end to the lug 113 of said catch lever 106 and at the other end to a pin 118 mounted on the brace 86.

A release lever 108 pivoted on the catch lever 106 at 109, is adapted to engage a pin 110 secured to the multi-lobed wheel 29. Rotation of the wheel 29 will cause pin 110 to engage the release lever 108, the other end of which will abut against the stop pin 111 mounted on a catch lever 106, which will in turn clear the projection 33 of the lever 31 whereby said projection 33 will drop on the lobes 30 of the wheel 29. Thus the meter will not start recording until pin 111 abuts the release lever 108 and, depending on the relative position of said pin 111, any non recording starting interval may be obtained up to one revolution of the wheel 29.

The release lever 108 is urged against the stop pin 111 by means of a spring wire 112 mounted on the pivot 101 and lug 113 of the catch lever 106.

The taximeter according to the invention may be easily provided with counting devices, which are not shown, for recording the number of trips, the number of miles and the number of units, that is the number of times the pawl 36 engages a tooth of the ratchet 38 for rotation of the same. For that purpose, the lever 31 is provided with a suitable link 114 which will actuate the counter (not shown) for recording the number of units, the roller arm 75 will have a suitable lever pivoted at 115 as shown in Figure 1 for actuating a counter (not shown) recording the number of trips, while the worm gear 24 will be provided with a pin 116 for actuation of a suitable counter (not shown) for recording the number of miles.

Figure 1 shows the taximeter in vacant position, in this position the pawl 36 and the pin 102 on the triangular plate 100 are out of engagement with the teeth of the ratchet wheel 38, thus the shaft 39 is maintained in its starting position by means of the roller arm 75 engaging the recess in the heart cam 81, the clutching members 17, 18 and 25, 26 are disengaged by means of the declutching arms 73 and the main shaft 14 is maintained in its starting position by the roller arm 92 contacting the recess in the heart cam 94 keyed to said main shaft 14. The shutter 53 is in closed position because the rod 64 engages the extension 65 of said shutter and finally the bell crank 61 is maintained out of engagement with the ratchet wheel 44.

Upon rotating the control shaft 57 to its waiting time non recording position, the element 76 closes the electric circuit to the light bulb 88, the shutter 53 is opened, the main shaft 14 is clutched and actuated only by the speedometer cable 22, and therefore the fare is registered only according to the speed of the car.

When the control shaft is turned one more step to its waiting time recording position, the pin 89 on the element 76 closes the electric circuit to the motor 4 which drives the shaft 14 at a predetermined minimum constant speed while the speedometer cable 22 will drive said shaft 14 at speeds above said predetermined minimum speed.

It will be noted that the taximeter, according to the invention, may be easily adapted to different tariff structures by effecting a minimum of changes. For changing the initial or starting fare, it is only necessary to displace the heart cam 81 on the shaft 39 so that a different denomination may appear through the registering window 51 when said shaft is in its starting position.

If it is desired to have the fare dial 46 rotate at more than one step for each revolution of the fare dial 40, it is only necessary to affix more than one pawl 43 on the disc 42 by pivoting the same in holes 117 made in said disc 42 for that purpose.

In the drawings, the multi-lobed wheel 29 is shown as having four lobes 30 in order to operate the mechanism every quarter of a mile, but said wheel 29 may be easily changed in order that the units may be based on, for example one-third of a mile in which case there will be three lobes 30, or half a mile in which case there will be only two lobes 30. Furthermore, in the drawings, the arrangement is such that the initial charge of 35¢ covers the first quarter mile, but if the initial rate be charged on say half a mile it will be simple to alter the position of the heart cam 94 on the main shaft 14 such that the pin 110 on the multi-lobed wheel 29 will have to make half a revolution before engaging the release lever 108.

While a preferred embodiment according to the invention has been illustrated and described it is understood that various modifications may be resorted to without departing from the spirit and scope of the appended claims.

I claim:

1. A taximeter comprising a casing having a front and back wall, a main shaft extending within said casing and journalled in said front and back walls, a constant speed drive, a first clutch member freely rotatable on said main shaft and drivingly connected to said drive, a vehicle speed responsive drive including a second clutch member freely rotatable on said main shaft, complementary clutch members keyed to said main shaft and axially displaceable on the same to take a first position engaging said first and second clutch members and a second position out of engagement with the same, spring means urging said complementary clutch members into their engaged position, a manually operable control shaft extending substantially parallel with said main shaft and journalled in said front and back walls, means extending between said control shaft and said complementary clutch members operable by said control shaft to displace said complementary clutch members into their disengaged position, a multi-lobed cam wheel keyed on said main shaft adjacent said back wall, a lever pivotally mounted on said back wall intermediate its ends and spring urged to engage at one end said cam wheel, a pawl mounted on said lever at the other end, a ratchet wheel displaceable step by step by said pawl, a dial shaft extending substantially parallel with said main shaft and journalled in said front and back walls, said ratchet wheel keyed to said dial shaft, a fare dial keyed to said dial shaft adjacent to said front wall to register with a window made therein, a heart cam keyed on said dial shaft, a positioning arm keyed on said control shaft and engageable with said heart cam upon rotation of said control shaft to rotate said dial shaft to a predetermined starting position, a second heart cam keyed on said main shaft, a second positioning lever keyed on said control shaft and engageable with said second heart cam upon rotation of said control shaft for rotating said main shaft to a predetermined starting position, an arm mounted on said control shaft and engageable with the end of said lever opposite to said pawl in one position of said control shaft to maintain said pawl out of engagement with said ratchet wheel, a holding pawl pivotally mounted on said back wall and spring urged to engage said ratchet wheel and to hold the same against return movement, a catch lever pivoted on said back wall and engageable with the free end of said first mentioned lever to hold said pawl out of engagement with said ratchet wheel and means operable by said multi-lobed cam wheel when the same has rotated a certain predetermined angle to release said catch lever whereby said first mentioned lever is brought into engagement with said cam wheel, said release means comprising a pin projecting from said multi-lobed cam wheel and a release lever pivotally mounted on said catch lever and engageable with said pin.

2. In a taximeter, fare indicating means, a main shaft, a multi-lobed cam wheel secured to said main shaft, a pin projecting from said cam wheel, a ratchet wheel for operating said fare indicating means, a lever, a pawl mounted on said lever and engageable with said ratchet wheel to displace the same step by step upon actuation of said lever by said cam wheel, a catch lever to hold said first named lever in a position with said pawl out of engagement with said ratchet wheel, and a release lever pivotally mounted on said catch lever and engageable with said pin to release said catch lever from said first mentioned lever when said cam wheel has rotated a predetermined angle.

3. In a taximeter, fare indicating means, actuating means therefor, means for operating said actuating means, manually operated means for controlling the connecting and disconnecting of said last named means to and from the said actuating means, and means for preventing the operation of said actuating means for an initial period after said actuating means have been connected with said operating means, said actuating means comprising a multi-lobed cam wheel, a pawl operated by said cam wheel and a ratchet wheel displaceable step by step by said pawl, said preventing means comprising a catch lever operable to hold said pawl out of engagement with said ratchet wheel, a pin projecting from said cam wheel and a release lever pivotally mounted on said catch lever and engageable with said pin to release said catch lever when the cam wheel has rotated a predetermined angle.

4. In a taximeter, fare indicating means, a main shaft, a control shaft, resetting means for said main shaft comprising a heart cam adjustably secured thereon and a resetting arm secured to said control shaft and engageable with said heart cam, actuating means for said fare indicating means comprising a multi-lobed cam wheel secured to said main shaft, a ratchet wheel, a lever engageable by said cam wheel, a pawl on said lever engageable with said ratchet wheel to displace said ratchet wheel step by step, a catch lever engageable with said first named lever to hold said pawl out of engagement with said ratchet wheel and operable by said control shaft, a pin on said multi-lobed cam wheel and a release lever pivotally mounted on said catch lever and engageable with said pin to release said catch lever after said main shaft has rotated a predetermined angle, said angle depending on the adjusted angular position of said heart cam relatively to said multi-lobed cam wheel.

References Cited in the file of this patent

UNITED STATES PATENTS

| Number | Name | Date |
| --- | --- | --- |
| 886,244 | Picard | Apr. 28, 1908 |
| 1,000,276 | MacPherson | Aug. 8, 1911 |
| 1,258,310 | Bratton | Mar. 5, 1918 |
| 1,275,185 | Kurowski | Aug. 6, 1918 |
| 1,438,853 | Phillips | Dec. 12, 1922 |
| 1,581,678 | Chisley | Apr. 20, 1928 |
| 1,744,307 | Gluck | Jan. 21, 1930 |
| 1,762,862 | Gluck | June 10, 1930 |
| 1,806,353 | Johnson | May 19, 1931 |
| 1,874,962 | Gluck | Aug. 30, 1932 |
| 2,428,080 | Horn | Sept. 30, 1947 |
| 2,596,164 | Palmer | May 13, 1952 |